United States Patent [19]

Modisette

[11] Patent Number: 4,857,723
[45] Date of Patent: Aug. 15, 1989

[54] SEGMENTED IMAGING PLATE STRUCTURE

[75] Inventor: J. Everett Modisette, San Antonio, Tex.

[73] Assignee: Texas Medical Instruments, Inc., Schertz, Tex.

[21] Appl. No.: 129,235

[22] Filed: Dec. 7, 1987

Related U.S. Application Data

[63] Continuation-in-part of Ser. No. 95,884, Sep. 14, 1987, Pat. No. 4,778,985.

[51] Int. Cl.$^4$ .............................................. G01D 5/34
[52] U.S. Cl. ........................... 250/213 R; 250/370.08
[58] Field of Search ......... 250/213 R, 370 GX, 327.2, 250/213 VT; 313/366, 386, 507; 365/112; 378/29

[56] References Cited

U.S. PATENT DOCUMENTS

| | | | |
|---|---|---|---|
| 3,970,844 | 7/1976 | Fenn, Jr. et al. | 378/29 |
| 4,085,327 | 4/1978 | Swank et al. | 250/213 VT |
| 4,184,069 | 1/1980 | Bosserman | 250/213 VT |

Primary Examiner—David C. Nelms
Assistant Examiner—Khaled Shami
Attorney, Agent, or Firm—Arthur M. Dula

[57] ABSTRACT

An imaging plate comprising a first conductive layer having a plurality of conductive segments arranged thereabout, a photoconductive sandwich structure affixed to the first conductive layer, and a second conductive layer integrally affixed to the side of the photoconductive sandwich structure opposite the first conductive layer. The conductive segments of the first conductive layer are electrically connected to a conductor such that each of the conductive segments are selectively addressable. Each of the conductive segments is a conductive strip separated from adjacent conductive strips by dielectric material. The conductor is an accumulator bar extending across the conductive layer transverse to the conductive strips. A photoconductive bridge conects each of the conductive strips with the accumulator bar. The photoconductive bridge is a photoconductive dot. Each of the photoconductive dots is addressable by a properly positioned photon beam.

20 Claims, 5 Drawing Sheets

SEGMENTED IMAGING PLATE STRUCTURE

RELATED APPLICATIONS

The present application is a continuation-in-part of U.S. Application Ser. No. 095,884, filed on Sept. 14, 1987, now U.S. Pat. No. 4,778,985, and entitled "Imaging Plate Structure".

FIELD OF THE INVENTION

The present invention relates to apparatus used to obtain radiographic information. More particularly, the present invention relates to an imaging plate configuration used to provide an electrostatic charge image in accordance with the varying amount of incident electromagnetic radiation received by the plate structure. Specifically, the present invention relates to an imaging plate structure having a relatively low capacitance outer conductive layer.

BACKGROUND ART

The extensive development and improvement of xerographic methods of photocopying documents has led, in recent years, to renewed attempts to exploit the special properties of this process for both industrial and medical radiography. Early attempts to introduce the method were unsuccessful, principally because the sensitivity of the selenium plates was then too low to compete with film but also because the associated apparatus was not sufficiently convenient or reliable in every day use. Additionally, the commercial return was judged unattractive by the manufacturers.

In xeroradiography the detecting medium is a thin film of a photoconductor; a substance, that is, which normally contains very few charge carriers but in which radiation can liberate new carriers with a lifetime long enough to enhance greatly the natural conductivity. The surface of the photoconducting layer is first given a uniform surface charge, usually laid down by a corona charging device, and has been enclosed in a light-tight cassette and exposed to the radiation penetrating through the irradiated object. The original uniform charge is partly dissipated by the current thus induced in the photoconducting layer and the residual charge pattern on the object forms a "latent image" of the radiation. This charge pattern must then be made visible by some appropriate method of development. There are many ways of doing this, but the method usually employed in radiographic work is to expose the electrostatic "latent image" to an aerosol of electrically charged powder particles. These adhere to the surface principally in the regions of high field strength and thus delineate clearly any sharp steps or steep gradients in the charged density.

The conductivity induced in selenium by visible light has been studied very extensively. Very little conductivity is produced in vitreous selenium by light of wavelengths longer than 5,500 angstroms. The absorption coefficient and the induced conductivity both rise rapidly as the wavelength is reduced and below 4,000 angstroms the quantum yield (carrier pairs per photon absorbed) reaches unity at high field strengths. It cannot rise above unity since a single quantum of light in the visible or near ultraviolet can produce, at most, one pair of carriers. Blue light is strongly absorbed and the photons cannot penetrate beyond a very thin "photon absorption layer", within which all the charge carriers, positive holes and negative electronics, are formed. It was only until a few years ago that the observed strong dependence of conductivity upon field strength in the selenium could be explained very satisfactorily by two processes: recombination of positive and negative charge carriers within the photon absorption layer (where both kinds are present) and trapping of those carriers which escaped from the photon absorption layer as they were driven through the bulk of the selenium under the influence of the field.

U.S. Pat. No. 4,521,808, issued on June 4, 1985 to the University of Texas System describes an electrostatic imaging apparatus having a plate structure sequentially arranged as follows: electrode, insulator, photoconductive layer, diode layer, and electrode. In this invention, the diode layer is a layer of aluminum oxide that acts as a blocking contact between the electrode layer and the photoconductive layer. This very thin aluminum oxide layer acts as a blocking contact to retain the positive charge on the surface of the selenium. In this configuration, the blocking layer had a blocking potential that would have to be overcome for the current to flow through the contact. Unfortunately, after much experimentation with such an arrangement, it was found that a thin, aluminum oxide "diode layer" would create carriers between the photoconductive layer and the metallic electrode layer. The creation of these carriers reduces the hold time of the charge on the surface of the photoconductive layer, causes leakage across the diode junction, and requires a complementary output readout. It was found that such a configuration would not hold the charge sufficiently long to enable a readout over a large plate structure surface area. Additionally, the need to read the complementary output would distort the image by receiving large signals that would otherwise be categorized as "noise". This creates some distortion and abnormalities in the final image.

The subject of U.S. Pat. No. 4,521,808 was a electrostatic imaging plate known as the "Anderson System". A problem with the Anderson System, following experimentation, indicated that it was difficult to use as a large-area detector because of the amount of capacitance that builds up in the outer conductive layers of the plate structure. In essence, the capacitance in the large-area surface creates a large amount of noise relative to the signal produced by the readout techniques described in this patent.

The IBM technical Disclosure Bulletin, Volume 9, No. 5, of October 1966, pages 555 and 556, discloses a charge-storage beam-addressable memory. This device is a sandwich structure of semi-conductive and insulating materials. This structure is irradiated at selected points or under the influence of applied electric fields to store charges representing data bits. The reading out of the stored bits is accomplished by irradiating the semiconductor at selected points and observing the resultant discharge current. This memory structure has a configuration sequentially organized as follows: electrode, insulator, semiconductor, insulator, and electrode. The semiconductor material used in amorphous selenium. To perform writing, the beam is directed at any selected spot in the semiconductor while the device applies an electric field of selected polarity, representing one or zero, across the electrode layers. The semiconductor becomes locally conductive at the point where it is addressed by the beam, causing localized charges to be built up in the insulating layers at that point under the influence of the applied field. These local charges are trapped, at least for a limited time, when the beam is removed and the semiconductor reverts to its normal state.

The plate structure described in the IBM Technical Disclosure Bulletin is a digital memory storage system that looks for polarity output. This would not work effectively where amplitude output and imaging needs were required. In essence, the IBM system is looking for the existence of a signal or looking for the polarity output. As such, the system does not require the use of true insulators. The insulator used in this IBM structure is a made of a "defect" material that causes the charge to be trapped within the insulator rather than at the interface of the insulator and the photoconductive layer. In addition, it is difficult to construct the apparatus of the IBM disclosure since the tantalum or niobium oxides used in the insulating layer would interrupt the structure of the selenium. This configuration of materials would cause the selenium to recrystallize and to work less effectively.

In prior-art applications of imaging plates, the photoconductive layers have been responsive to a particular range of light wavelengths. In many instances, the photoconductive material used would have great responsiveness to a particular wavelength of light but have a low charge retention time. In other cases, the photoconductive material used would have a high retention time but would be limited and responsive to only particular light wavelengths. As such, the photoconductive materials used in prior-art imaging plates did not act as ideal photoreceptors. Each of the systems would have limitations when applied to particular systems of readout and particular wavelengths of light reception.

It is an object of the present invention to provide a imaging plate structure that effectively retains the charge while preventing losses due to carriers.

It is another object of the present invention to provide an imaging plate structure that allows for the readout of amplitude output.

It is another object of the present invention to provide an imaging plate that is responsive to a wider range of light wavelengths while providing for high retention times.

It is still a further object of the present invention to provide an imaging plate structure that is suitable for large-area imaging systems.

It is still another object of the present invention to provide an imaging plate structure that has an outer conductive layer with relatively low capacitance.

Another object of the present invention is to provide an imaging plate structure that maximizes the signal-to-noise ratio during readout.

It is still another object of the present invention to provide an imaging plate structure that is relatively easy to manufacture.

These and other objects and advantages of the present invention will become apparent from a reading of the attached specification and appended claims.

SUMMARY OF THE INVENTION

The present invention is an imaging plate structure that comprises a first conductive layer having a plurality of conductor segments arranged thereabout, a photoconductive sandwich structure affixed to the first conductive layer, and a second conductive layer integrally affixed to the other side of the photoconductive sandwich structure opposite the first conductive layer. The conductive segments of the first conductive layer are electrically connected to a conductor such that each of the conductive segments are selectively addressable. The photoconductive sandwich structure is responsive when the imaging plate structure is exposed to radiation of known energies.

The first conductive layer has a plurality of conductive segments that are linearly arranged conductive strips extending across the first conductive layer. Each of the conductive strips is separated from adjacent conductive strips by a dielectric material. An accumulator bar extends across the conductive layer transverse to the longitudinal axis of the conductive strips. A photoconductive bridge connects each of the conductive strips of the accumulator bar. This photoconductive bridge serves to switchably electrically connect each of the conductive strips with the accumulator bar. The photoconductive bridge comprises a photoconductive dot interposed between each of the photoconductive strips and the accumulator bar and a light beam addressing system optically connected to the photoconductive dot. This light beam addressing system serves to cause the photoconductived dot to become selectively conductive. The light beam addressing system comprises a plurality of light-emitting diodes arranged adjacent to the first conductive layer such that each of the light emitting diodes corresponds to the location of a photoconductive dot. The photoconductive dot is comprised of a selenium material.

The photoconductive sandwich structure comprises a first insulative layer integrally affixed to the first conductive layer and having a thickness suitable for preventing charge tunnelling therethrough, a photoconductive layer integrally affixed to the side of the first insulative layer opposite the first conductive layer, and a second insulative layer integrally affixed to the side of photoconductive layer opposite the first insulative layer. The first insulative layer and the second insulative layer are made of a true insulator material. The photoconductive layer is responsive when the imaging plate structure is exposed to radiation of known energies. The second insulative layer also has an appropriate thickness for preventing charge tunnelling. The second conductive layer is integrally affixed to the side of the second insulative layer opposite the photoconductive layer.

The second conductive layer has a plurality of conductive segments arranged thereabout. The conductive segments of the second conductive layer are electrically connected to a conductor such that each of the conductive segments of the second conductive layer are selectively addressable. The second conductive layer has a plurality of linearly arranged conductive strips extending across the second conductive layer. The conductive strips of the second conductive layer have a longitudinal axis offset by ninety degrees (90°) from the conductive strips of the first conductive layer.

The present invention also comprises a novel method of recording an reading out a latent image. This method comprises the following steps. First, a multilayered detector apparatus is exposed to a modulated radiation flux capable of producing electron hole pairs. The multilayered detector apparatus has a photoconductive layer biased by an electrical field during the exposing whereby a modulated surface charge is placed on the photoconductive layer. The multilayered detector apparatus also has an outer conductive layer comprised of a plurality of selectively addressable conductive segments. Secondly, the plurality of conductive segments is individually addressed such that each of the conductive segments becomes electrically transmissive to a conductor. Thirdly, the plurality of conductive segments is scanned during the period in which the conductive segments are electrically transmissive. During this step, the modulated surface charge is at least partially discharged. Fourthly, the changing potential of the discharge is measured as a function of time.

In this method, the conductive segments comprise a plurality of linear strips extending across the outer conductive layer. The linear strips are connected to the conductor by a photoconductive bridge. The step of addressing comprises the step of directing a photon beam to the photoconductive bridge such that the linear strip becomes electrically conductive as to the conductor.

The step of scanning comprises the separate steps of: (1) scanning the linear conductive strip during the time that the photon beam is directed to the photoconductive bridge; (2) removing the photon beam from the the photoconductive bridge such that the linear strip is nonconductive with respect to the conductor; and (3) directing the photon beam to an adjacent photoconductive bridge such that an adjacent linear strip becomes electrically conductive.

DETAILED DESCRIPTION OF THE INVENTION

Figure 1:
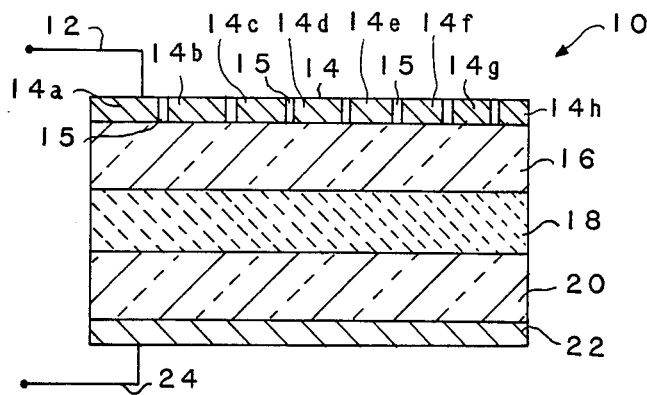
FIG. 1 is a greatly enlarged cross-sectional view of the preferred embodiment of the imaging plate structure taught by the present invention.

Referring to FIG. 1, imaging plate structure 10 has a first electrode 12 conductively connected to a segmented first conductive layer 14. A true first insulative layer 16 is integrally affixed to the first conductive layer 14. Insulative layer layer 16 has a thickness suitable for preventing charge tunnelling. Photoconductive layer 18 is integrally affixed to the side of the first insulative layer 16 opposite the first conductive layer 14. This photoconductive layer 18 is responsive when the imaging plate structure 10 is exposed to radiation of known energy. A second true insulative layer 20 is integrally affixed to the photoconductive layer 18 opposite the first insulative layer 16. This second insulative layer 20 has a thickness suitable for preventing charge tunnelling. A second conductive layer 22 is integrally affixed to the side of the second insulative layer 20 opposite the photoconductive layer 18. A second electrode 24 is conductively connected to the second conductive layer 22.

In the preferred embodiment of the present invention, first conductive layer 14 and first insulative layer 16 are transmissive with respect to radiation acting on the imaging plate structure. First conductive layer 14, as shown in FIG. 1, has conductive segments 14a–h. Each of the conductive segments 14a–h is separated from adjacent segments by a dielectric material 15. Dielectric material 15 serves to prevent charges from passing to adjacent segments. Layers 14 and 16 are transparent to electromagnetic radiation. These layers may be made by vapor deposition or by adhesively bonding the individual components together.

The conductive layers 14 and 22, excluding dielectric 15, can be made of any metals or alloys with high electrical conductivity such as gold, silver, aluminum, copper, chromium, titanium, platinum, and the like. Other materials such as transparent indium-tin oxide with lower electrical conductivity may be used. Still further, and alternatively, the transparent conductor 14 may be Nesa glass, a thin film of metal deposited directly on the insulative layer 16, or a plastic film with a conductive coating, such as gold-covered MYLAR ™ or indium-tin oxide coated. Still further, and alternatively, the conductive layers 14 and 22 can be composed of an organic complex. These organic complexes can include nitro, cyano, halogen, and quinone compounds. The range of resistivities can be from $1 \times 10^{+16}$ to $1 \times 10^{-1}$ ohm-cm. Specific examples of such organic complexes which can be used for the conductive layer include polyphenothiazine with a methyl group; poly-3, 6-carbazole with methyl and methoxy groups, iodine, NO located on the 9 position; and poly-3, 5-indole with the same additions as the previous carbazole arrangement.

It is important in the present invention that insulator layers 16 and 20 be "true" insulators. A true insulator is one that will not conduct in electric fields of the particular application. Only "true" insulators will keep the charges trapped within the photoconductive layer 18 during the exposure to known radiation. These true insulators would include oxides such as $SiO_x$, $SiO_2$, $Al_2O_3$, SiN. Additionally certain organic, carbonhydrogen based insulators may be used. These carbon-hydrogen based insulators are polymers having no heteratoms, no pi bonding, and no overlap of orbitals for conduction (as available with charge transfer complexes). In insulators, the valence band is full, the conduction band empty, and no motion of charge results from the application of electric field. Certain types of chain aromatic polymers may be used as the organic insulators for layers 16 and 20. Specifically, these chain aromatic polymers could include polytetrafluoethylene, polyfluorene, polyanthracene, and polyindene. Certain types of vinyl polymers may be used as the insulative layers 16 and 20. These vinyl polymers may include polyvinyl halides, polyvinyl monomers (fluorene, anthracene, and naphthalene); polyvinyl benzene (polystyrene); polyvinyl xylene; and polyvinyl biphenyl. In addition, a very poor conductor such as polyvinyl carbazole may be used for the insulative layers 16 and 20.

Photoconductive layer 18 is, importantly, positioned between the adjacent insulative layers 16 and 20. It is an important aspect of the present invention that the photoconductive layer 18 be positioned between true insulative layers. It is important for the operation of the photoconductive layer and the associated readout of the imaging plate structure 10 that the insulating layers 16 and 20 have a thickness suitable for preventing charge tunnelling. In the preferred embodiment of the present invention, the insulative layer should have a thickness greater than 100 Angstroms. It is believed that the above-stated materials with a thickness of 10,000 Angstroms will serve the insulative purposes of layers 16 and 20, although thinner layers may be suitable.

The photoconductive layer 18 is made of a material that is chosen because of its responsiveness to the particular sections of the electromagnetic spectrum. Likely candidates for material used in the photoconductive layer 18 include selenium, lead selenide, doped polymers, mercury cadmium telluride, cadmium telluride, and cadmium sulfide.

The photoconductive layer 18 can be comprised of a photoconductive polymer. The first photoconductive polymer, poly-N-vinyl carbazole, was originally reported in 1957. This would be a suitable material for use in the photoconductive layer 18. The following table summarizes certain characteristics of various photocurrents in various unsensitized polymers.

TABLE I

| Polymer | Magnitude of photocurrent $i_{ph}/i_d$ | λ,mμ | $E_{ph}$ eV |
|---|---|---|---|
| Polyethylene | | $i_{ph}$ at 254, not 365 | |
| Polyethylene | 10-1000 | $i_{ph}$ mainly at 260 | 0.1 |
| Poly(vinyl chloride) | 10-100; <1 at high humidity | $i_{ph}$ mainly at 260 | 1.9 |
| Poly(vinyl chloride) | 10-100 | $i_{ph}$ mainly at 260 | 1.8-1.9 |
| Polyacenaphthylene | 2; increases with nitration to 100 | | |
| Poly [1,3-diphenyl-5-(4-vinylphenyl)-2-pyrazoline] | 30-150 | greatest response at 400-425 | |
| Poly(vinylidene chloride) (Saran) | 10-1000 | at 254, not at 365 | |
| Poly-p-phenylene and polyvinylenes | 5-20 | | 0.1-0.25 |
| Polyvinylene | | 0.2-1.2 | |
| Poly-p,p'-diethynylazobenzene | 3-5 | maxima at 330 and 610 mμ | 1.8 |

TABLE I-continued

| Polymer | Magnitude of photocurrent $i_{ph}/i_d$ | λ,mμ | $E_{ph}$ eV |
|---|---|---|---|
| Other polyacetylenes | 3-5 | | |
| Poly-N-vinylcarbazole | | high gain in to 500 m μ | |
| polyimidazopyrrolone (BTDA DAB) | 200-300 | 200-1300 (λmax at 550) | 0.36 |
| Polyimidazopyrrolone (PMDA DAB) | 40-60 | 200-1400 (λmax at 600) | 0.62 |

$i_{ph}$ = photocurrent;
$i_d$ = dark current;
$E_{ph}$ = activation energy of photocurrent.

Electrostatic imaging techniques have also been studied and have found photoconductivity in the following polymers: polystyrene, polyvinylxylene, poly-1-viylnaphthalene, poly-2-vinylnaphthalene, poly-4-vinylbiphenyl, poly-9-vinylanthracene, poly-3-vinylpyrene, poly-2-vinylquinoline, polyvindene, polyacenaphthylene, poly(3.3'-dimethyl-4.4'-diphenylene), aromatic and teteroaromatic derivatives of polyacrylamide, and polymethacrylamide. with these polymers, the presence of heteroatoms, high electrons, and particularly polyaromatic structures improves the photoresponse. Additionally, the most promising photoconducting systems may prove to be those in which small amounts of electron donor or acceptor impurity ("dopants") have been added.

Sensitization of photoconductivity, or "doping," refers to the addition of small amounts of impurities to the host substance and is a technique that can be used to increase the dark conductivity and photoconductivity of the host material in molecular crystals and in organic semiconductors. It is possible to use poly-N-vinylcarbazole and other polymers with aromatic and heterocyclic groups as photoconductors. This photoconductivity can be enhanced by electrode acceptors, such as nitro compounds, cyano compounds, organic acids, carboxylic acid in hydrides, esters, halogen compounds, quinones, keto compounds, and aza compounds. Other polymers with aromatic groups can show photoresponse when doped with the same acceptors. Low-molecular-weight pi donors, structurally similar to the polymers, show a photoresponse and enhancement by using the same acceptors, when dispersed in film-forming resin binders. Acceptors such as tetrachlorophthalic anhydride, 2,4,7-trinitro-9-fluourenone, and tetrachloro-p-benzoquinone enhance the effects of photoconductivity on poly-N-vinylcarbazole and its monomer N-vinylcarbazole. This polymer-acceptor interaction greatly increases the photoconductivity of poly-N-vinylcar in the region of the charge-transfer band, but has little effect in the ultraviolet region. Doping by using trace amounts of strong mineral acids gives a strong photoresponse in a polyvinylene films. Additionally, small amounts of crystalline zinc sulfide cause appreciable photoconductivity and polyvinylchloride and in polystyrene after ultraviolet irradiation.

In essence, all of the above-stated materials can be chosen and used as the photoconductive layer 18 of the imaging plate structure 10 of FIGURE 1. The specific type of material to use will depend upon the radiation acting upon the plate structure 10, the desired charge retention time, and the desired simplicity of manufacture. Improved manufacturing techniques, reduced manufacturing costs and simplicity of assembly favor the use of the photoconductive polymers as the photoconductive layer 18. The entire structure 10 can be made by depositing successive layers of conductor, insulator, photoconductor, insulator and conductor upon a substrate. Assembly may be accomplished by vapor deposition, sputtering or any other technique useful to deposited even thickness films. The technology of assembling is well developed in the art of semiconductor electronics and glass manufacturing.

Thickness of the photoconductive layer must be selected to maximize the quantum efficiency of the detector. This optimum thickness will be a function of the photoconductor's characteristics, the potential at which the detector is operated and the energy of the photons or other particles to which the plate structure is exposed that act to discharge the photoconductive layer.

In essence, the greater the thickness of the photoconductive layer, the more that the photoconductive layer acts with given energy of exposing radiation and the more electron-hole pairs a given quantity of radiation produces. Conversely, as the photoconductive layer 18 is made thinner, the electric field acting on these electron-hole pairs become stronger (the same potential over less distance).

In contrast with the Electrostatic Imaging Apparatus of U.S. Pat. No. 4,521,808, issued June 4, 1985, to which the present patent owner owns exclusive rights, the present invention offers certain improved characteristics.

After experimentation with the previously recited plate structure, it was found that whenever a photoconductive layer was adjacent to a conducting material, carriers would be generated. As more carriers are create, retention times are diminished and image quality deteriorates. It was determined that, through light beam readout, it was difficult to scan and readout the image before carriers were produced and the charge was no longer retained at the photoconductor/insulator interface.

The subject of U.S. Pat. No. 4,521,808 utilized a diode layer so as to prevent leakage. Since the characteristics of a diode require that the diode layer have a thickness of less than ten angstroms, the diode layer was unable to properly hold the charge for a suitable period of time. In essence, a true insulator with a greater than diode thickness is required to prevent this leakage and to maintain the hold time of the charge at the photoconductor/insulator interface.

It was further found that the inclusion of a "diode" layer required discharge during exposure. This resulted in a complementary output. This technique of reading complementary output resulted in "noise" having a greater-than-expected impact on the final image quality.

The configuration of the preferred embodiment of the present invention eliminates the problem of the diode layer of the aforestated patent. In the present invention, a "true" insulator layer is interposed between the photoconductive layer 18 and the adjacent conducting layers 14 and/or 22. As such, the present invention prevents charge tunnelling, increases hold time, allows charging during exposure, and allows the readout of either complementary or non-complementary output.

Figure 2:
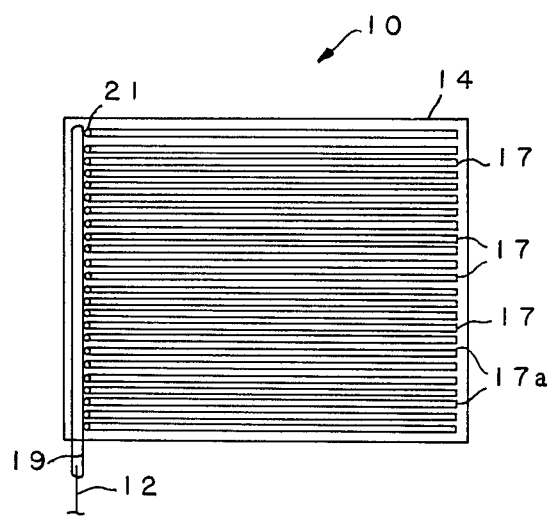
FIG. 2 is a top view of the segmented conductive layer in accordance with the preferred embodiment of the imaging plate structure of the present invention.

FIG. 2 shows a top view of the multilayered detector apparatus 10 of FIG. 1. In particular, this top view shows the configuration of the segmented conductive layer 14. As can be seen, the conductive layer 14 is comprised of a large plurality of conductive segments 17 electrically connected to a conductor 19. Each of the plurality of conductor segments 17 is separated from adjacent conductive segments by dielectric material 17a. The conductive segments 17 are linearly arranged conductive strips extending across the first conductive layer 14. The conductor 19 is an accumulator bar that extends across the conductive layer transverse to the longitudinal axis of the conductive strips 17. An electrical bridge 21 connects each of the conductive strips 17 with the accumulator bar 19. The electric bridge 21 serves to switchably electrically connect each of the conductor strips 17 with the accumulator bar 19. The electric bridge 21 is a photoconductive dot that is interposed between each of the photoconductive strips 17 and the accumulator bar 19. The photoconductive dot may be a selenium, or selenium-derived material. It is important that the material of electric bridge 21 be of a type that allows conductivity between conductive strips 17 and accumulator 19 when acted on by a photon beam. Electrical lead 12 is electrically connected to accumulator bar 19 so as to pass the electronic signal from the multilayered detector apparatus 10 external of the system.

Figure 3:
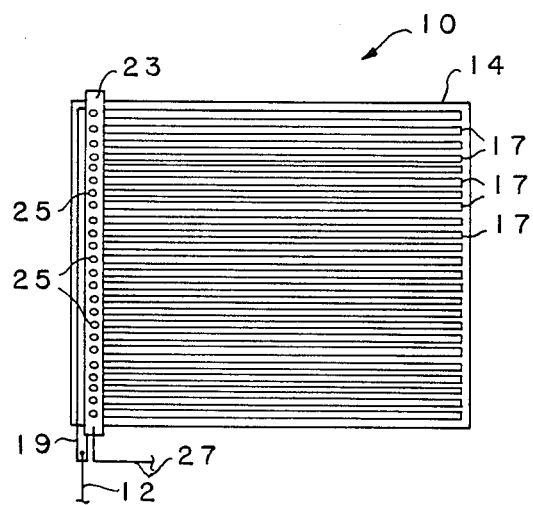
FIG. 3 is a top view illustrating the segmented conductive layer of the imaging plate structure of the present invention having a light-emitting diode configuration arranged thereabove.

FIG. 3 illustrates a light beam addressing system 32. As illustrated in FIG. 3, the light beam addressing system 23 is optically connected to each of the photoconductive dots 21. The light beam addressing system 21 serves to cause the photoconductive dot to become selectively conductive The light beam addressing system 23, as illustrated in FIG. 3, comprises a plurality of light-emitting diodes 25. As can be seen, each of the light-emitting diodes corresponds to the location of a photoconductive dot. Each of the light-emitting diodes 25 is controlled and selectively actuated by way of electrical line 27. Although a plurality of light-emitting diodes 25 is suggested as the mechanism for addressing each of the photoconductive bridges between the conductive strip 17 and the accumulator bar 19, it is possible to use a plurality of other photon beam actuating mechanisms to accomplish the same purpose. The essential requirement of the present invention is that each of the separate conductive strips 17 be selectively addressable.

Figure 4:
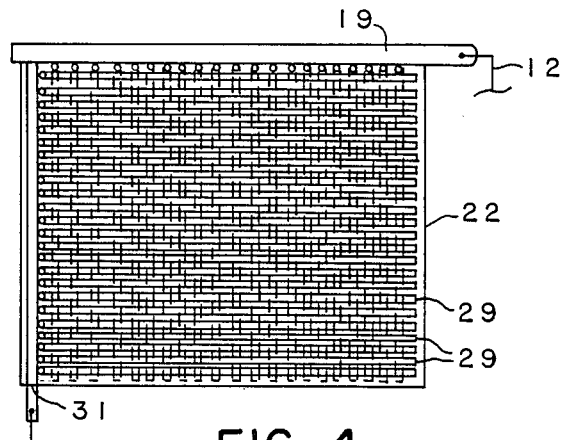
FIG. 4 is a top view of the imaging plate structure of the present invention showing the relationship of the segments of the top conductive layer in relation to the segments of the bottom conductive layer.

FIG. 4 illustrates the arrangement of the second conductive layer 22 showing, in particular the relationship of the conductive strips of each layer. The arrangement of the second conductive layer 22 is similar to that of the first conductive layer 14. The major difference is that the conductive strips 29 of the second conductive layer 22 are arranged such that the longitudinal axis of the conductive strips 29 of the second conductive layer 22 are offset by ninety degrees (90°) from the conductive strips of the first conductive layer 14. As with the first conductive layer 14, each of the conductive strips 29 is separated by an appropriate dielectric and is connected, by an appropriate switching means, to the accumulator bar 31.

The configuration of the conductive layers 14 and 22 of the present invention is an improvement in conductive layer structures not found in prior-art imaging systems. The segmentation of the conductive layers of the present invention offers a number of advantages not found in these prior-art system. First, the segmentation of the conductive layers reduces the amount of noise that passes from the plate structure. In prior-art systems, using a single, non-segmented conductive layer, the large amount of area creates a large amount of noise because of the capacitance that builds up throughout the outer conductive layers of the plate structure. This noise is large compared to the small signal produced by the readout techniques. Secondly, the segmentation of the conductive layers would permit multiple light beam readout and thus faster production of image information. Thirdly, the segmentation allows for the proper structuring of large-area detectors. Previously, large-area imaging systems were thought impossible because of the large amount of noise build-up that would occur across the conductive layers. By reducing the amount of noise coming from the conductive layer, proper image information can be obtained without massive amounts of filtering, amplification, and signal processing. The segmentation of the structure of the conductive layers of the present invention serves to reduce capacitance greatly. The photoconductive dot serves as an appropriate switch between the conductive strips and the accumulator bar. The photoconductive dots meet the requirements of the system by being able to switch between the separate segments quickly. The photoconductive dots allow the passing of low current. It is also difficult to destroy the photoconductive dots, acts as a switch, where excessive charges build up across the plate structure. The photoconductive dots would survive in situations in which other electrical switches would be destroyed by the charge build-up.

Figure 5:
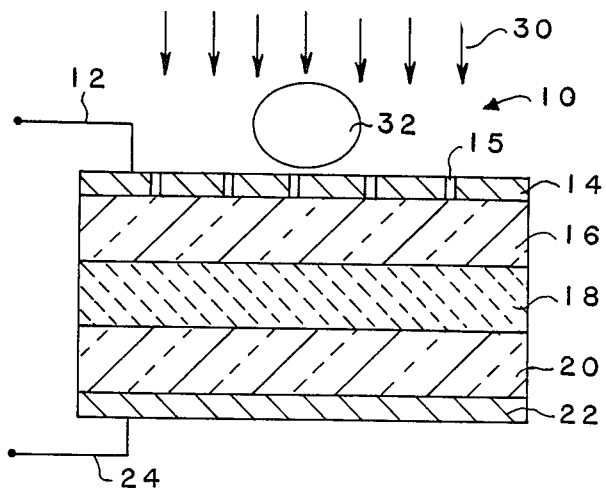
FIG. 5 illustrates the imaging plate structure of the preferred embodiment of the present invention as it is used in an imaging system.

FIG. 5 shows the charged imaging plate 10, illustrated in FIGURE 1, being used as an image receptor structure for an X-ray image. Uniform X-ray flux 30 is generated by a convenient source of radiation, such as an X-ray tube, not shown. The detector will operate with any radiation source capable of generating electron whole pairs in the photoconductive layer 18. The uniform photon flux encounters and interacts with object 32, which may be any object of interest. Object 32 is placed over the transmissive conductive layer 14 and adjacent to such transmissive segmented conductive layer 14. For simplicity, object 32 is represented as an oblate spheroid of uniform density.

Figure 6:
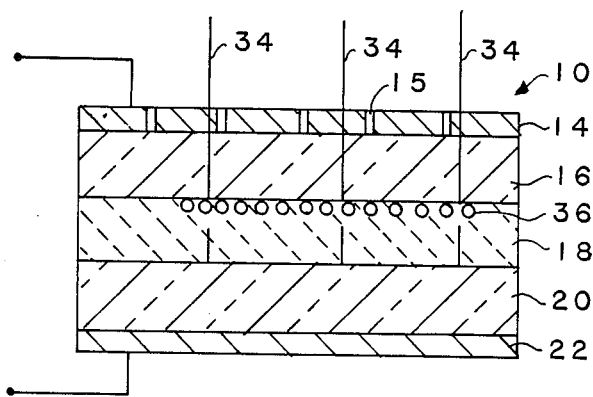
FIG. 6 is a greatly enlarged schematic cross-sectional view of the imaging plate structure of FIG. 1 illustrating the effect of modulated radiation flux upon the plate structure.

FIG. 6 shows a greatly enlarged schematic view of a portion of the imaging plate structure 10 of FIG. 5. The modulated radiation flux 34 from the radiation 30 passes through the object 32 and creates electron-hole pairs 36 at the interface of the photoconductive layer 18 and the transmissive insulative layer 16. Since the insulative layer 16 is a true insulator, the electron-hole pairs 36 will be trapped at the photoconductive/insulator interface, as shown in FIG. 6.

Figure 7:
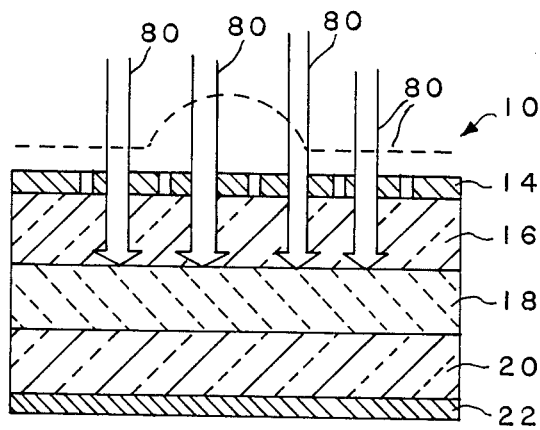
FIG. 7 is a schematic view of the imaging plate structure taught by the present invention being readout by this scanning photon beam. A schematic representation of the surface charge of the detector is shown.

FIG. 7 shows the imaging plate structure 10 after the radiation exposure has been completed. The plate is now storing a latent image. The modulated surface charge comprising the image is schematically illustrated by humped dotted line 38. This dotted line represents the change in potential created by the electron-hole pairs generated by the radiation exposure. FIG. 7 shows the imaging plate structure having the latent image stored as a modulated surface charge 38. A thin beam of light 40 is shown scanning the surface of the photoconductive layer 18 in a regular raster pattern. This thin scanning light beam can be produced by a helium-cadmium laser. It should be understood that the photon beam 40 need not be coherent. Photon beam 40 may be of any frequency capable of creating electron-hole pairs in the photoconductive layer 18 of imaging plate structure 10.

Electrode 41 is connected to electrical ground and electrode 43 carries an electrical signal whose wave form is a function of the modulated surface charge 38 in plate 10 as scanned by light beam 40. The analog output from the scanning of the plate structure will be indicative of the voltage variation of the output signal obtained by the beam 40 scanning the latent image. Light beam 40 penetrates the transmissive conductive layer 14 and the transmissive insulative layer 16 to generate electron-hole pairs in the portion of the photoconductive layer 18 irradiated by the beam 40.

Functionally, the imaging and readout of the plate structure 10 is as follows. This method requires that the imaging plate structure 10 be sensitized responsing to a radiation image to be provided by a radiation source (not shown). The imaging plate structure 10 is sensitized by providing a uniform high electrical field between the conductive layers 14 and 22 at the outer surfaces of the insulative layers 16 and 20. For the imaging plate structure, this is accomplished by connecting a DC voltage source directly between the first segmented conductive layer 14 and the second conductive layer 22. The polarity of the voltage that is applied may be dictated by the material used in the photoconductive layer 18.

When the imaging plate structure is so sensitized, and the DC voltage source is connected to the imaging plate structure 10, the radiation imaging source is operated to expose the device to a radiation image, the radiation of which is absorbed by the photoconductive layer 18 causing the conductivity of absorbing areas to increase. This allows the charges at the photoconductor/insulator interface, where the radiation is absorbed, to move to the inner surface of the photoconductive layer 18 so as to establish an electrostatic charge image of the radiation image at the photoconductor/insulator interface. The increased conductivities of such areas of the photoconductive layer 18 can be viewed as reducing the effective thickness of the capacitor provided between the two conductive layers 14 and 22. The DC voltage level and the total exposure to radiation at a given area of the photoconductive layer 18 will determine the amount of the charges that are moved through the photoconductive layer. There is, in effect, a time integration of the radiation energy received by the photoconductive layer 18. FIG. 6 shows the final disposition of charges in response to the imaging radiation that is absorbed by the photoconductive layer 18.

After the electrostatic image is established, it is readout by connecting the DC voltage source in series with the readout electronics. As illustrated in FIG. 7, scanning radiation 40 is progressively directed to the areas of the conductive layer 14 in timed relationship to the operation of the readout electronics. The readout electronics receive electrical signals indicative of the charge flow that takes place at the area of the device to which the scanning radiation is directed. In this manner, a point-by-point readout in the form of electrical signals is obtained for the electrostatic image that was formed. Accordingly, when the scanning radiation is directed to an area where the entire charge for the electrostatic charge image is at the upper surface of the photoconductive layer 18, no electrical signal is produced so long as the voltage provided by the DC voltage source is unchanged. Similarly, when the scanning radiation is directed to an area where no imaging radiation was received by the photoconductive layer 18, the charge that was presented at the outer surface of photoconductive layer 18 is transferred to the upper surface of photoconductive layer 18. Further, since the readout radiation has caused the conductivity of photoconductive layer 18 at such area to increase, thereby reducing the effective thickness of the capacitor provided between the conductive layers 14 and 22, the presence of a uniform DC voltage across the device 10 requires additional charge flow to maintain such voltage. This additional charge flow increases the electrical signal presented to the readout electronics for the area being scanned. The magnitude of the readout signal produced by the scanning process for a given area of the imaging plate structure 10 will, of course, vary inversely with the amount of imaging radiation that was received by the area.

As the laser beam 40 scans the surface of the photoconductive layer 18, it generates electron-hole pairs. These electron-hole pairs are mobile within the photoconductive layer 18 and discharge a portion of the surface charge. In the preferred embodiment of the present invention, the electrons move toward the positively charged surface of the photoconductive layer 18. The voltage drop produced across the resistor connected between the ground connection 41, which is attached to transmissive conductive layer 14, and output electrode 43, which is attached to the conductive layer 22, will be a function of the intensity of the surface charge at the point where the laser beam generates the electron-hole pair.

THe laser beam 40 produces a modulated electrical signal at the output electrode 43. The voltage of this output electrical signal will be a function of the surface charge present at the spot where the laser beam strikes the photoconductive layer 18 of the imaging plate structure 10. During the readout process of the multilayered detector apparatus of the present invention, as the laser beam 40 produces a modulated electrical signal, each of the plurality of conductive segments 17 is addressed such that each of the conductive segments becomes electrically transmissive to the accumulator bar 19. In particular, where an arrangement of light-emitting diodes is utilized, as illustrated in FIG. 3, an individual light-emitting diodes are sequentially activated. This light-emitting diode is adjacent the photoconductive dot so as to allow the charge in the particular conductive segment 17 to pass to the accumulator bar 19. The plurality of conductive segments is scanned by the laser beam 40 during the period in which the conductive segment is electrically transmissive. As a result, for each conductive segment, the modulated surface charge is at least partially discharged. In essence, the step of scanning comprises the steps scanning the linear strip during the time that a photon beam is directed to the photoconductive bridge, removing the photon beam from the photoconductive bridge such that the linear strip becomes nonconductive, and directing the photon beam to an adjacent photoconductive bridge such that an adjacent linear strip becomes electrically conductive. There is coordination between the laser beam 40 and the addressing of the photoconductive bridges. As a result, the voltage of the output electrical signal would be a function of the surface charge within the conductive strip. This greatly reduces capacitance since the output electrical signal is not taken from a point on the full surface area of the conductive layer. The current present in the output circuit is a function of the frequency and intensity of the scanning light beam and is a further function of the speed with which the light beams scans the surface of the photoconductive layer 18. A video signal can be electronically processed to produce an image that represents the latent image found in the surface charge of the photoconductive layer of the imaging plate structure 10.

Figure 8:
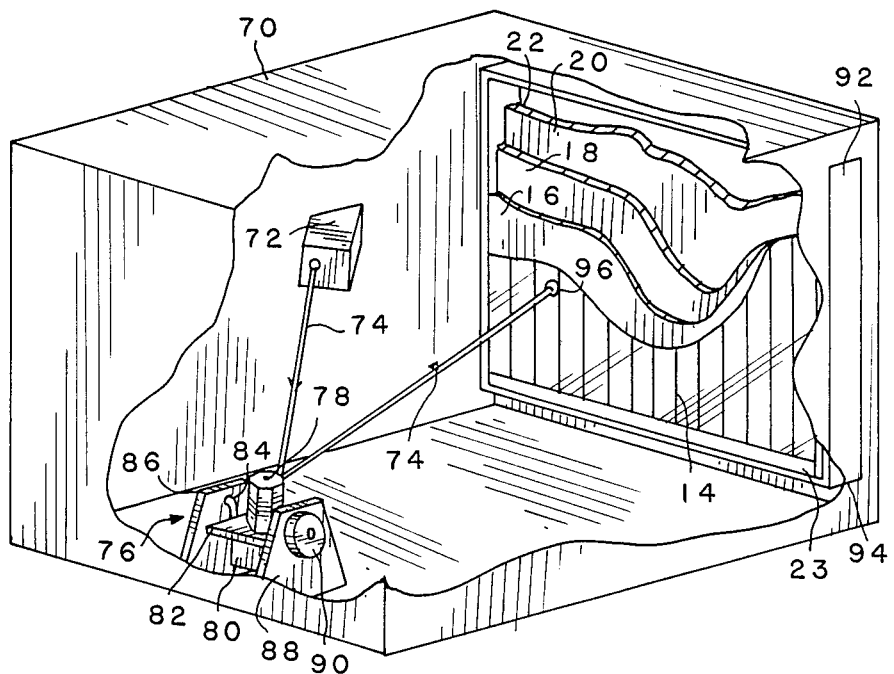
FIG. 8 shows a partially cut-away view of the imaging plate structure and apparatus adapted to practice the preferred embodiment of the present invention.

FIG. 8 shows a partially cut-away view of an apparatus capable of reading out the image whose generation was discussed above. Light-tight housing 70 contains a light source 72 aligned so as to project a light beam 74 under the front of a scanning means 76 which may be a rotating multisided mirror. Mirror 76 is mounted on an axis 78 which is operable attached to a scanning motor 80. The mirror axis and a scanning motor are affixed to a flat platform 82. This platform is mounted on an axis 84 which is orthogonal to axis 78. Axis 84 is mounted at one end to first upright support 86 and its other end to second upright support 88 the end of axis 84 is swingably mounted in second upright support 88 and is operably attached to stepping motor 90. This scanning means comprising the mirror and associated positioning components is available from Texas Medical Instruments, Inc., One Corporate Drive, Schertz, Tex. 78154. Mirror 76 and its associated scanning mechanism is located at one end of housing 70. An imaging plate structure 92 is removably inserted through a light-tight opening 94 into a holder at the other end of housing 70 such that the transmissive conductive layer 14 faces toward the mirror 76.

Light source 72 is preferably a helium-cadmium laser such as a Liconix Model No. 402 laser with an optical modulator. This laser produces a beam of intense light at approximately 4,400 angstroms.

Scanning motor 80 rotates multi-sided mirror 76 on axis 78 to cause light beam 74 to scan horizontally across the surface of imaging plate structure 92. This causes spot 96 to intersect the photoconductive layer as was discussed hereinbefore. Each time spot 96 moves from the left to the right side of imaging plate structure 92, stepping motor 90 moves platform 82 through a sufficient arc to deflect spot 96 vertically one-twentieth (1/20) of a millimeter. This stepping-scanning function may be controlled mechanically or electrically. By convention, spot 96 begins scanning the surface of detector 92 at its upper left hand corner. After raster scanning the entire surface of structure 92, the scanning mechanism may be programmed either to turn off or to rescan the plate.

Figure 9:
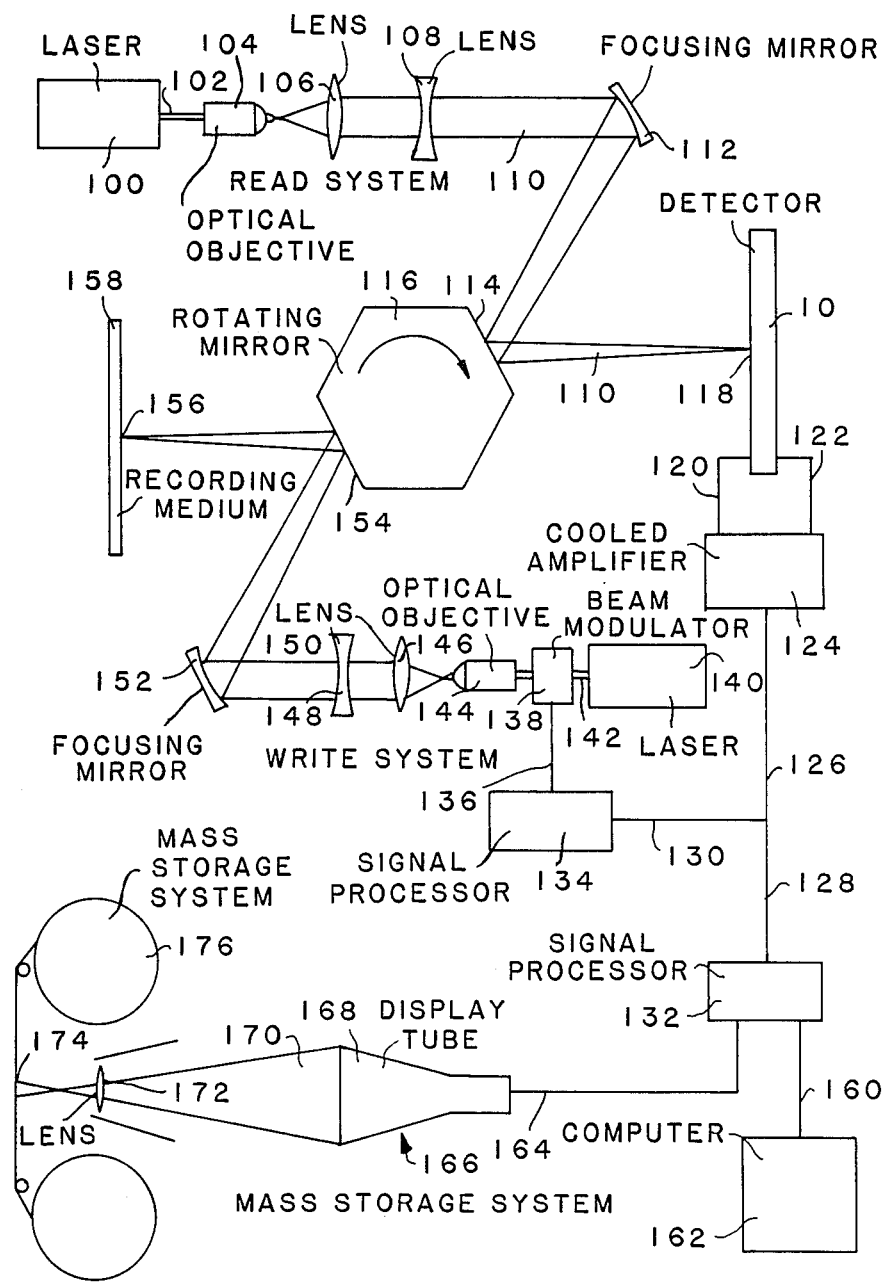
FIG. 9 is a schematic block diagram illustrating an imaging system constructed so as to use the imaging plate structure of the present invention.

FIG. 9 is a block diagram of a radiographic system taught by the present invention Laser 100 produces a small intense beam of light 102 which is expanded by optical objective 104 and lenses 106 and 108 into a reasonably wide parallel beam 110. Focusing mirror 112 reflects beam 110 on the reflective surface 114 of scanning mechanism 116. Scanning mechanism 116 is substantially the same as the scanning mechanism described in connection with FIG. 8 hereinbefore. The scanning mechanism may be any apparatus capable of moving the laser beam over the imaging plate structure. For example, it may be a set of computer controlled mirrors or holographic optics.

Beam 110 projects a small flying spot 118 onto the surface of the imaging plate structure 10. Imaging plate structure 10 was described in detail hereinbefore. Imaging plate structure 10 is electrically connected by lines 120 ad 122 to a cooled amplifier 124. Amplifier 124 may be a low-noise amplifier. Amplifier 124 is connected by line 126 to lines 128 and 130 which electrically connect the output of cooled amplifier 124 to signal processor 132 and second signal processor 134, respectively. Signal processor 134 is connected by line 136 to beam modulator 138. Laser 140 produces an intense beam of coherent light 142 which is modulated by beam modulator 138 and spread by optical objective 144 in lenses 146 and 148 to coherent modulated beam 150. Modulated beam 150 is focused by focusing mirror 152 onto a second mirror surface 154 of optical scanner 116. The surface may be another surface of the same scanner or may be separate scanning system.

Mechanical movement of scanning system 116 causes beam 150 to form flying spot 156 which scans the surface of recording medium 158. This process allows the very low intensity latent image on the imaging plate structure 10 to be electrically amplified by cooled amplifier 124 and signal processor 134 and then to be rewritten as an intensified image on a photographic or xerographic plate 158.

The electrical output of cooled amplifier 124 is also fed to signal processor 132 by lines 126 and 128. The output of signal processor 132 is connected by line 160 to a digital computer 162. Computer 162 is used to digitally store and manipulate the information imparted to it by the electrical signal produced by cooled amplifier 124 by the way of signal processor 132. The images may be stored on magnetic tape or disk files and can be manipulated within the computer by algorithms for image edge enhancement or pattern recognition for automated diagnosis. The output of signal processor 132 also goes by line 164 to mass storage system 166.

Mass storage system 166 contains a high resolution display tube 168 which produces an analog image 170 which is focused by focusing optics 172 onto a film plane 174 of a mass film storage system 176. This mass film storage system may be a 35 or 70 mm cassette system.

The type of radiographic image processing and storing system described in connection with FIG. 9 is especially useful for interfacing mass radiographic data acquisition equipment with the central computing facilities of a large hospital or diagnostic complex. Digital storage of the radiographic images allow the data to be accessed by a remote radiologist with speed and precision. Computer-based pattern recognition algorithms allow inexpensive gross screening of large patient populations for a radiographic anomolies. The system's ability to rewrite information obtained at very low radiation dosages onto conventional xeroradiographic plates or films permits the system to protect the patient while interfacing with presently existing radiographic data storage formats.

Figure 10:
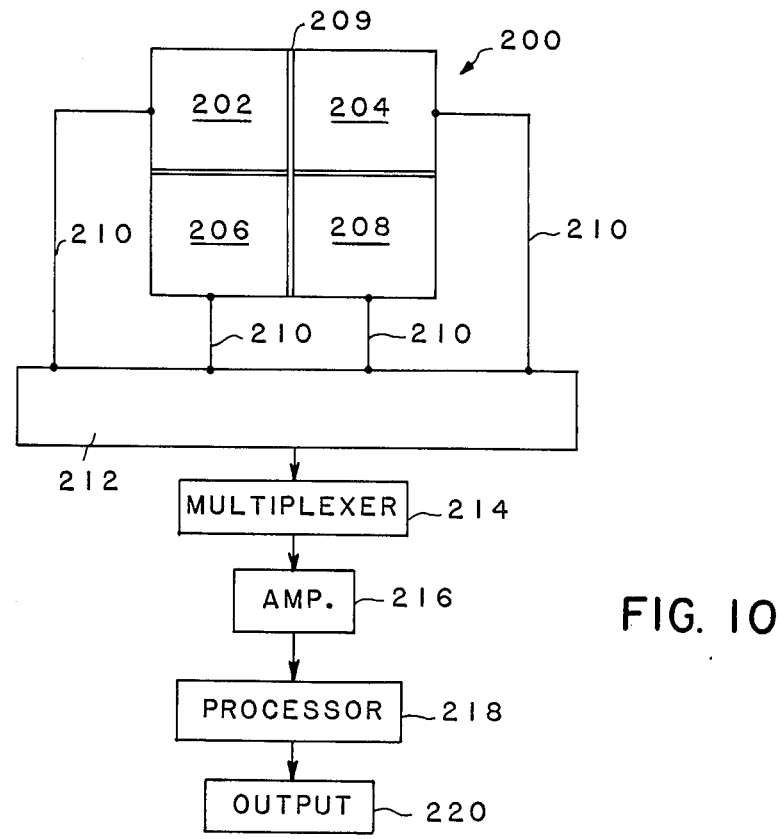
FIG. 10 is a schematic block diagram illustrating an alternative embodiment of the segmented multilayered detector apparatus of the present invention.

FIG. 10 shows an alternative embodiment of the configuration of the segmented conductive layer of the present invention. In FIG. 10, the conductive layer 200 is divided into four separate segments 202, 204, 206, and 208. Each of these segments 202, 204, 206, and 208 is connected by lines 210 to a busbar 212. Each of these separate segments 202, 204, 206, and 208 is separated by an appropriate dielectric material 209. Dielectric material 209 serves to electrically isolate each of the separate segments from each other and to prevent charge drifting between such segments. As a matter of illustration, each of the segments 202, 204, 206, and 208 covers a $10 \times 10$ pixel area. The illustration of FIG. 10 shows a small segment of the overall large-area platestructure. The illustration of FIG. 10 also shows a different configuration for the segmenting of the conductive layer 200 of the present invention.

In the arrangement of FIG. 10, each of the segments is of equal size and covers, generally, an equal number of pixels. Each of the segments is separately connected to busbar 212 which, in turn, is connected to multiplexer 214. Multiplexer 214 accesses each of the separate segments, amplifies the signal through amplifier 216, processes the signal through processor 218, and produces an image output 220. This form of segmentation serves to reduce the amount of capacitance across the conductive layer 200. Since the structure of FIG. 10 is read out through light beam technology, each of the segments is separated electrically from the other segments. As each of the segments 202, 204, 206, and 208 is read out, the image information can properly be processed without the problems of noise in the signal.

It should be noted that the configuration illustrated in FIG. 10 can be utilized on both the first and second conductive layers of the multilayered detector apparatus.

Figure 11:
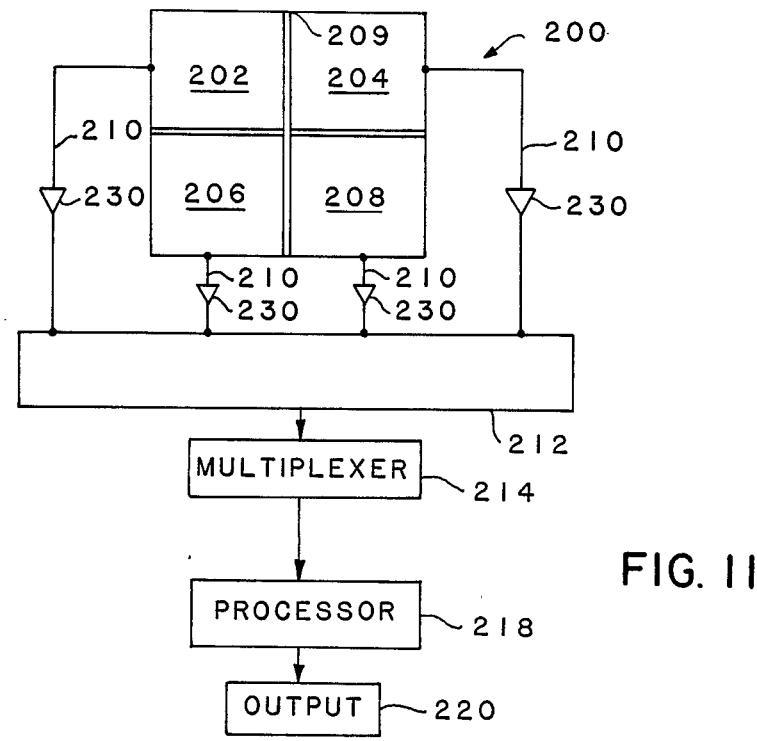
FIG. 11 is another alternative embodiment of the segmented detector structure as taught by the present invention.

FIG. 11 shows another alternative embodiment of the present invention. In FIG. 11, each of the lines 210 has a preamplifier 230 connected in line. This configuration will amplify the signal from each of the segments prior to passing the busbar 212. Although this is a more complicated manner of producing the image information, that was shown in FIG. 10, it is a possible embodiment of a workable segmented plate structure.

In keeping with the present invention, it is also possible to utilize multiple light beams to read out the image information simultaneously from the plate structure. For example, there can be four laser beams that are addressing the stored charge in the photoconductive layer 18. Since the conductive layer 14 is segmented, and the signals multiplexed, there can be no problem with overlapping information. This is particularly useful if the retention time of the charge at the insulator/photoconductor interface is short. The present invention allows several light beams to be used to scan the image information contained within the plate structure.

The present invention, and its embodiments represents a significant improvement over prior art imaging plate structures. By sandwiching the photoconductive layer (or layers) between true insulators, there can be little or no migration of the charges away from the photoconductors/insulators interface. This allows for a longer charge retention times and provides greater capabilities for readout. The present invention allows for charging during the exposure to modulated radiation. There is no need or requirement for discharge during exposure. Additionally, the present invention does not require the reading of complementary output. As a result, there are fewer problems created by "noise" in the system. The assembly and manufacture of the plate structure using known photoconductive polymers greatly facilitates the manufacture of these plate structures. It is quite difficult to work with and vapor deposit metal structures upon metal structures. Polymers, on the other hand, are relatively easy to apply and can be properly assembled by less complex spraying technology.

The present invention, through the use of segmented conductive layer structures, reduces the capacitance in the layers to proper, workable levels. Without segmentation, the capacitance that builds up throughout the outer conductive layers of the plate structure creates an excessive noise-to-signal ratio. The output signal becomes very difficult to work with when it is necessary to sort the noise from the signal. The present invention, on the other hand, by segmenting the conductive layers, reduces the amount of noise that passes from the plate structure. It allows multiple light beam readout and thus faster production of image information. The segmentation also allows for the proper development and structuring of large-area imaging plate structures. The present invention allows large-area imaging systems to become possible by reducing the noise coming from the conductive layer.

The example and suggested systems illustrated and discussed in this specification are intended only to teach those skilled in the art the best way known to the inventors to make and use their invention. Nothing in this specification should be considered as limiting the scope of the present invention. Many changes could be made by those skilled in the art to produce equivalent systems without departing from the invention. The present invention should only be limited by the following claims and their legal equivalents.

We claim:
1. An imaging plate structure comprising:
   a first conductive layer having a plurality of conductive segments each being larger in length and width than the pixel size defining the resolution of said plate structure and said conductive segments arranged thereabout, said conductive segments electrically connected to a conductor such that each of said conductive segments are selectively addressable;
   a photoconductive sandwich structure means integrally affixed to said first conductive layer, said photoconductive sandwich structure means being responsive when said imaging plate structure is exposed to radiation of known energies; and
   a second conductive layer integrally affixed to the side of said photoconductive sandwich structure means opposite said first conductive layer.

2. The structure of claim 1, said plurality of conductive segments comprising linearly arranged conductive strips extending across said first conductive layer, each of said conductive strips being separated from adjacent conductive strips by a dielectric material.

3. The structure of claim 2, said conductive comprising an accumulator bar extending across said first conductive layer transverse to the longitudinal axis of said conductive strips.

4. The structure of claim 3, a bridge means connecting each of said conductive strips with said accumulator bar, said bridge means for switchably electrically connecting each of said conductive strips with said accumulator bar.

5. The structure of claim 4, said bridge means comprising:
   a photoconductive dot interposed between each of said photoconductive strips and said accumulator bar; and light beam addressing means optically connected to said photoconductive dot, said light beam addressing means for causing said photoconductive dot to become selectively conductive.

6. The structure of claim 5, said light beam addressing means comprising a plurality of light-emitting diodes arranged adjacent said first conductive layer and each of said light emitting diodes corresponding to the location of a photoconductive dot.

7. The structure of claim 5, said photoconductive dot comprising selenium material.

8. The structure of claim 1, said photoconductive sandwich structure means comprising:
   a first insulative layer integrally affixed to said first conductive layer, said first insulative layer having a thickness suitable for preventing charge tunnelling therethrough, said first insulative layer being of a true insulator material;
   photoconductive layer means integrally affixed to the side of said first insulative layer opposite said first conductive layer, said photoconductive layer means being responsive when said imaging plate structure is exposed to radiation of known energies;
   a second insulative layer integrally affixed to the side said photoconductive layer means opposite said first insulative layer, said second insulative layer having a thickness suitable for preventing charge tunnelling therethrough, said second insulative layer being of a true insulator material, said second conductive layer being integrally affixed to the side of said second insulative layer opposite said photoconductive layer means.

9. The structure of claim 1, said second conductive layer having a plurality of conductive segments arranged thereabout, said conductive segments of said second conductive layer being electrically connected to a conductor such that each of said conductive segments of said second conductive layer are selectively addressable.

10. The structure of claim 2, said second conductive layer having a plurality of linearly arranged conductive strips extending across said second conductive layer, said conductive strips of said second conductive layer having a longitudinal axis offset by ninety degrees from said conductive strips of said first conductive layer.

11. A method of recording and reading out a latent image comprising:
   exposing a multilayered detector apparatus to a modulated radiation flux capable of producing electron hole pairs, said multilayered detector apparatus having a photoconductive layer biased by an electric field during said exposing whereby a modulated surface charge is placed on the photoconductive layer, said multilayered detector apparatus having an outer conductive layer comprised of a plurality of selectively addressable conductive segments;
   addressing each of said plurality of conductive segments such that each of said plurality of conductive segments becomes electrically transmissive to a conductor;
   scanning each of said plurality of conductive segments with a scanning beam that defines a pixel size smaller than the length and smaller than the width of the conductive segment being scanned.

12. The method of claim 11, each of said plurality of conductive segments being a linear strip extending across said outer conductive layer, said linear strip connected to said conductor by a photoconductive bridge, said step of addressing comprising the step of:
   directing a photon beam to said photoconductive bridge such that said linear strip becomes electrically conductive as to said conductor.

13. The method of claim 12, said step of scanning comprising the steps of:
   scanning said linear strip during the time that said photon beam is directed to said photoconductive bridge;
   removing said photon beam from said photoconductive bridge such that said linear strip is nonconductive with respect to said conductor; and
   directing said photon beam to an adjacent photoconductive bridge such that an adjacent linear strip becomes electrically conductive.

14. An improved conductive layer for a multilayered photon detector apparatus comprising:
- a plurality of electrically isolated conductive segments each being larger in length and in width than the pixel size defining the resolution of said photon detector arranged as a layer;
- an accumulator bar extending so as to be adjacent said plurality of electrically isolated conductive strips; and
- a photoconductor bridge interposed between each of said conductive segments and said accumulator bar so as to cause said conductive segments to be switchable electrically connected to said accumulator bar.

15. The layer of claim 14, said conductive segments comprising a plurality of linearly arranged conductive strips extending uniformly throughout said layer, each of said conductive strips being separated from adjacent conductive strips by a dielectric material.

16. The layer of claim 15, said accumulator bar extending transverse to the longitudinal axis of said conductive strip, said accumulator bar being adjacent an end of said conductive strips.

17. The layer of claim 14, said photoconductive bridge comprising:
- a dot of photoconductive material interposed between each of said conductive strips and said accumulator bar.

18. The layer of claim 17, said improved conductive layer further comprising:
- light beam addressing means optically connected to said dot of photoconductive material said light beam addressing means for causing said dot of photoconductive material to become selectively conductive.

19. The layer of claim 18, said light beam addressing means comprising:
- a plurality of light-emitting diodes arranged adjacent said photoconductive bridge, each of said light-emitting diodes corresponding to a separate dot of photoconductive material.

20. The layer of claim 17, said dot being comprised of selenium and said accumulator being comprised of gold.

* * * * *